United States Patent
Zheng et al.

(10) Patent No.: US 9,262,198 B2
(45) Date of Patent: Feb. 16, 2016

(54) CPU SCHEDULER CONFIGURED TO SUPPORT LATENCY SENSITIVE VIRTUAL MACHINES

(71) Applicant: VMware, Inc., Palo Alto, CA (US)

(72) Inventors: Haoqiang Zheng, Mountain View, CA (US); Lenin Singaravelu, Sunnyvale, CA (US); Shilpi Agarwal, San Mateo, CA (US); Daniel Michael Hecht, San Francisco, CA (US); Garrett Smith, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/468,121

(22) Filed: Aug. 25, 2014

(65) Prior Publication Data

US 2015/0058861 A1     Feb. 26, 2015

Related U.S. Application Data

(60) Provisional application No. 61/870,143, filed on Aug. 26, 2013.

(51) Int. Cl.

| | |
|---|---|
| G06F 9/46 | (2006.01) |
| G06F 9/455 | (2006.01) |
| H04L 12/875 | (2013.01) |
| H04L 12/26 | (2006.01) |
| H04L 12/927 | (2013.01) |

(Continued)

(52) U.S. Cl.
CPC ........ *G06F 9/45558* (2013.01); *G06F 9/45533* (2013.01); *G06F 9/5033* (2013.01); *G06F 9/5088* (2013.01); *G06F 13/24* (2013.01); *H04L 43/0894* (2013.01); *H04L 43/16* (2013.01); *H04L 47/56* (2013.01); *H04L 47/801* (2013.01); *G06F 9/50* (2013.01); *G06F 2009/45575* (2013.01); *G06F 2209/5017* (2013.01)

(58) Field of Classification Search
CPC ......................................................... G06F 9/50
USPC ......................................................... 718/104
See application file for complete search history.

(56) References Cited

U.S. PATENT DOCUMENTS

| | | |
|---|---|---|
| 7,765,543 B1 | 7/2010 | Weissman et al. |
| 8,166,485 B2 | 4/2012 | Krishnakumar et al. |
| 8,943,252 B2 * | 1/2015 | Waters .................. G06F 9/4843 710/260 |

(Continued)

OTHER PUBLICATIONS

"Deploying Extremely Latency-Sensitive Applications in VMware vSphere 5.5"; VMWare Technical Whitepaper (vmware.com); Aug. 27, 2013.*

(Continued)

*Primary Examiner* — Qing Chen
*Assistant Examiner* — Clint Thatcher

(57) ABSTRACT

A host computer has one or more physical central processing units (CPUs) that support the execution of a plurality of containers, where the containers each include one or more processes. Each process of a container is assigned to execute exclusively on a corresponding physical CPU when the corresponding container is determined to be latency sensitive. The assignment of a process to execute exclusively on a corresponding physical CPU includes the migration of tasks from the corresponding physical CPU to one or more other physical CPUs of the host system, and the directing of task and interrupt processing to the one or more other physical CPUs. Tasks of the process corresponding to the container are then executed on the corresponding physical CPU.

20 Claims, 6 Drawing Sheets

(51) Int. Cl.
*G06F 13/24* (2006.01)
*G06F 9/50* (2006.01)

(56) References Cited

U.S. PATENT DOCUMENTS

| | | | | |
|---|---|---|---|---|
| 2007/0150898 | A1* | 6/2007 | Duda | G06F 9/4887 718/104 |
| 2010/0125843 | A1* | 5/2010 | Saito | G06F 9/5077 718/1 |
| 2010/0229173 | A1* | 9/2010 | Subrahmanyam | G06F 9/45533 718/103 |
| 2011/0197003 | A1 | 8/2011 | Serebrin et al. | |
| 2011/0247001 | A1* | 10/2011 | Smith | G06F 9/52 718/104 |

OTHER PUBLICATIONS

"VMware, Coreinfo and mapping logical CPU cores to physical processors"; Shogan.tech (www.shogan.co.uk) How-to website; Jun. 28, 2011.*

"Best Practices for Performance Tuning of Latency-Sensitive Workloads in vSphere Virtual Machines," VMware Technical White Paper, May 15, 2013, pp. 1-9, available at: http://web.archive.org/web/20130515013812/http://www.vmware.com/files/pdf/techpaper/VMW-Tuning-Latency-Sensitive-Workloads.pdf.

"What's New in VMware vSphere 5.1—Performance" VMware Technical Marketing Documentation, V 1.0 / Oct. 2012, Aug. 9, 2013, pp. 1-17, available at: http://web.archive.org/web/20130809042604/http://www.vmware.com/files/pdf/techpaper/Whats-New-VMware-vSphere-51-Performance-Technical-Whitepaper.pdf.

"Network I/0 Latency on VMware vSphere 5—Performance Study" VMware Technical White Paper, May 31, 2013, pp. 1-15, available at: http://web.archive.org/web/20130531071037/http://www.vmware.com/files/pdf/techpaper/network-io-latency-perf-vsphere5.pdf.

Alizadeh et al, "Less is More: Trading a little Bandwidth for Ultra-Low Latency in the Data Center" USENIX Apr. 11, 2013, pp. 1-14.

Singaravelu, "Performance and Use Cases of VMware DirectPath I/0 for Networking" VMware VROOM! Blog Dec. 6, 2010, pp. 1-8, available at: http://blogs.vmware.com/performance/2010/12/performance-and-use-cases-of-vmware-directpath-io-for-networking.html.

Li et al, "Affinity-Aware Dynamic Pinning Scheduling for Virtual Machines" 2nd IEEE International Conference on Cloud Computing Technology and Science, Nov. 30, 2010, pp. 242-249.

International Search Report mailed Dec. 3, 2014 in counterpart PCT Application PCT/US2014/052555.

International Search Report mailed Dec. 11, 2014 in counterpart PCT Application PCT/US2014/052557.

International Search Report mailed Nov. 6, 2014 in counterpart PCT Application PCT/US2014/052560.

International Search Report mailed Nov. 10, 2014 in counterpart PCT Application PCT/US2014/052564.

* cited by examiner

| Latency Sensitivity Table 155 | | |
|---|---|---|
| VM ID $210_1$ | Latency Sensitivity Indicator = Y | Entitlement = 100% |
| VM ID $210_2$ | Latency Sensitivity Indicator = N | Entitlement = 100% |
| ⋮ | ⋮ | ⋮ |
| VM ID $210_N$ | Latency Sensitivity Indicator = N | Entitlement = 50% |

FIG. 2

CPU SCHEDULER CONFIGURED TO SUPPORT LATENCY SENSITIVE VIRTUAL MACHINES

CROSS REFERENCE TO OTHER APPLICATIONS

This application claims priority to U.S. Provisional Patent Application No. 61/870,143, entitled "TECHNIQUES TO SUPPORT HIGHLY LATENCY SENSITIVE VMs," filed Aug. 26, 2013, the contents of which is incorporated herein by reference. This application is related to: U.S. patent application Ser. No. 14/468,122, entitled "Virtual Machine Monitor Configured to Support Latency Sensitive Virtual Machines", filed Aug. 25, 2014; U.S. patent application Ser. No. 14/468,181, entitled "Networking Stack of Virtualization Software Configured to Support Latency Sensitive Virtual Machines", filed Aug. 25, 2014; and U.S. patent application Ser. No. 14/468,138, entitled "Pass-through Network Interface Controller Configured to Support Latency Sensitive Virtual Machines", filed Aug. 25, 2014, the entire contents of which are incorporated herein by reference.

BACKGROUND

Applications characterized as "latency sensitive" are, typically, highly susceptible to execution delays and jitter (i.e., unpredictability) introduced by the computing environment in which the application runs. Examples of latency sensitive applications include financial trading systems, which usually require split-second response time when performing functions such as pricing securities or executing and settling trades.

Execution delay and jitter is often introduced by computer hardware components. For example, an application may issue input/output (I/O) requests to read data from or write data to a data storage device that can introduce unwanted latency. In addition, a slow or unreliable network connection may cause delay and/or jitter. In some cases, the operating system software running on a host may itself be a cause of delay or jitter, especially in virtualized systems, where a virtual machine running the application shares processing resources with other virtual machines and other system tasks. First, the virtual machine may be forced to wait prior to execution when there is insufficient processing resources. Further, even when the virtual machine is scheduled for execution right away, a previously executing process will need to be halted and requeued for later execution, introducing delays. There may also be situations where the virtual machine is preempted by other (higher priority) system tasks or hardware interrupts. Finally, certain system features, such as hyperthreading or frequency scaling (which provides for the adjustment of the operating speed of a physical processor based on system load) may be the source of additional delays.

SUMMARY

In a host computer having one or more physical central processing units (CPUs) that support the execution of a plurality of containers, the containers each including one or more processes, a method of assigning at least one of the processes to have exclusive affinity to a corresponding physical CPU is provided. The method comprises the steps of determining that a first container is latency sensitive and responsive to the determining, assigning each of the processes of the first container to have exclusive affinity to one or more corresponding physical CPUs. The assigning comprises the steps of migrating running tasks on the corresponding physical CPUs to the one or more other physical CPUs of the host system, directing queued tasks and interrupt processing for the corresponding physical CPUs to the one or more other physical CPUs, and executing tasks of each of the processes of the first container on the one or more corresponding CPUs to which the process has exclusive affinity.

Further embodiments provide a non-transitory computer-readable medium that includes instructions that, when executed, enable a host computer to implement one or more aspects of the above method, and a computer system programmed to implement one or more aspects of the above method.

BRIEF DESCRIPTION OF THE DRAWINGS

FIG. 2 is a block diagram that depicts a table for storing latency sensitivity information, according to embodiments.

DETAILED DESCRIPTION

Figure 1:
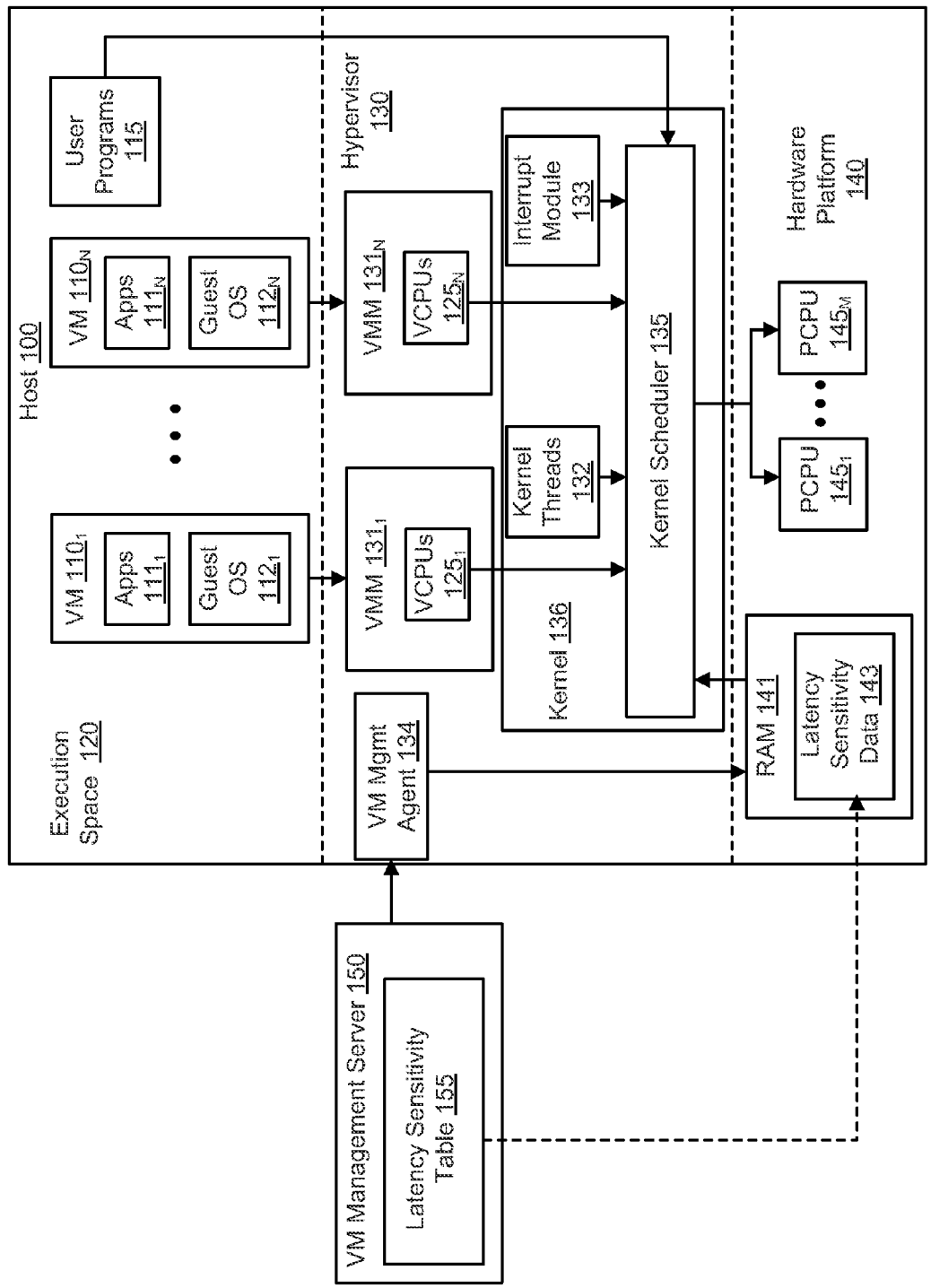
FIG. 1 is a diagram depicting a virtualized computing environment in which one or more embodiments may be implemented.

FIG. 1 depicts a virtualized computing environment in which one or more embodiments may be implemented. As shown, the computing environment includes a host computer 100 and a virtual machine (VM) management server 150. VM management server 150 communicates with host computer 100 over a local connection or, alternatively, over a remote network connection (not shown).

Host computer 100 is, in embodiments, a general-purpose computer that supports the execution of an operating system and one more application programs therein. In order to execute the various components that comprise a virtualized computing platform, host computer 100 is typically a server class computer. However, host computer 100 may also be a desktop or laptop computer.

As shown in FIG. 1, host computer 100 is logically divided into three different components. First, execution space 120 supports the execution of user-level (i.e., non-kernel level) programs. User-level programs are non-privileged, meaning that they cannot perform certain privileged functions, such as executing privileged instructions or accessing certain protected regions of system memory. Among the programs that execution space 120 supports are virtual machines and user programs.

Virtual machines are software implementations of physical computing devices and execute programs much like a physical computer. In embodiments, a virtual machine implements, in software, a computing platform that supports the execution of software applications under the control of a guest operating system (OS). As such, virtual machines typically emulate a particular computing architecture. In FIG. 1, execution space 120 includes VMs $110_1$-$110_N$. Each VM 110 shown supports the execution of one or more applications 111, each of which executes under the control of a particular guest OS 112. Applications 111 are user-level (non-kernel) programs, such as, for example, word processors or spreadsheet programs. Each of the depicted guest OS' 112 may be one of the well-known commodity operating systems, such as any of the versions of the Windows® operating system from Microsoft Corp., the Linux® operating system, or MacOS® X from Apple, Inc. It should be noted that the applications and guest OS' may vary from one VM to another. Thus, applications $111_1$ in VM $110_1$ may include Microsoft's Word® and Excel® applications running under the control of Windows® 7 as guest OS $112_1$. By contrast, applications $111_N$ in VM $110_N$ may include the Safari® web browser running under the control of MacOS® X as guest OS $112_N$.

In addition to virtual machines $110_1$-$110_N$, execution space 120 includes one or more user programs 115. In embodiments, user programs 115 are software components that execute independent of any virtual machine. Examples of user programs 115 include utilities that perform various system-oriented functions, such as facilitating communication with the kernel, providing directory services, and the like. Such programs, like virtual machines, execute at the user level, meaning that these programs cannot perform certain privileged (kernel-level) functions. As shown in FIG. 1, each of VMs $110_1$-$110_N$ and user programs 115 communicates with a hypervisor component, referred to herein as hypervisor 130.

Hypervisor 130, as depicted in FIG. 1, provides the operating system platform for running processes on computer host 100. Hypervisor 130 controls all hardware devices within computer host 100 and manages system resources for all applications running therein. Among the core functions that hypervisor 130 provides are console services, file system services, device drivers, and resource scheduling. Further, hypervisor 130 implements software components that provide for the instantiation of one or more virtual machines on the host computer.

As depicted in the embodiment of FIG. 1, hypervisor 130 includes virtual machine monitors (VMMs) $131_1$-$131_N$. Each VMM 131 corresponds to an executing VM 110. Thus, VMM $131_1$ corresponds to VM $110_1$, VMM $131_2$ corresponds to VM $110_2$, and so on. Each VMM 131 is a software layer that provides a virtual hardware platform to the guest OS for the corresponding virtual machine. It is through a particular VMM 131 that a corresponding VM accesses services provided by the kernel component of hypervisor 130 (shown in FIG. 1 as kernel 136). Among the functions carried out by kernel 136 are memory management, providing networking and storage stacks, and process scheduling.

Each VMM 131 in FIG. 1 implements a virtual hardware platform for the corresponding VM 110. Among the components of the implemented virtual hardware platform are one or more virtual central processing units (or VCPUs) 125. Thus, VMM $131_1$ implements a first set of VCPUs $125_1$, VMM $131_2$ implements a second set of VCPUs $125_2$, and so on. Each VCPU 125 appears to be a physical CPU from the standpoint of the applications 111 and the guest OS 112 that run in the corresponding VM 110. In this way, a virtualized guest operating system that runs within a virtual machine may schedule and dispatch processes for execution on one or more virtual CPUs in the same way that an operating system that runs directly on a computer host (i.e., in a non-virtualized manner) schedules and dispatches processes for execution on physical CPUs. However, from the standpoint of hypervisor 130 (which, in typical embodiments, executes directly on computer host 100), each VCPU 125 is a process to be scheduled and dispatched on a physical CPU of computer host 100.

In one or more embodiments, kernel 136 serves as a liaison between VMs 110 and the physical hardware of computer host 100. Kernel 136 is a central operating system component, and executes directly on host 100. In embodiments, kernel 136 allocates memory, schedules access to physical CPUs, and manages access to physical hardware devices connected to computer host 100.

As shown in FIG. 1, kernel 136 executes one or more kernel threads 132. Kernel threads 132 are processes that perform operating system functions, such as memory and device management, and which execute in a privileged mode (as opposed to user programs 115, described earlier, which execute in a non-privileged mode). Kernel 136 also includes an interrupt module 133. According to embodiments, interrupt module 133 (which may also be referred to as an interrupt handler) comprises one or more operating system functions, whose execution is triggered by the detection of an interrupt, such as those generated by hardware devices. Interrupt module 133 includes several types of interrupt handlers, which respond to interrupts generated by a particular hardware device or software module. Each interrupt handler in interrupt module 133 runs as a kernel-level process, much like kernel threads 132.

Kernel 136 also includes a kernel scheduler 135. Kernel scheduler 135 is responsible for scheduling tasks for execution on the physical CPUs of computer host 100. It should be noted that all tasks that execute on computer host 100 must share its underlying hardware resources. This includes random access memory, external storage, and processing time on the physical CPUs. Thus, the tasks that kernel scheduler 135 schedules for processing include VCPUs 125 (which are the virtual CPUs of executing VMs), user programs 115, kernel threads 132, and interrupt handlers that execute as part of interrupt module 133. Indeed, as shown in FIG. 1, each of these process types is depicted as feeding into kernel scheduler 135. In embodiments, kernel scheduler 135 maintains a separate run queue for each physical CPU (not shown). That is, kernel scheduler 135 schedules a process for execution on a particular physical CPU by placing that process in the run queue for that particular physical CPU. Typically, a physical CPU only selects processes from its own queue for execution thereon.

However, it is possible for one physical CPU to become idle while other physical CPUs have jobs waiting in their run corresponding run queues. Thus, periodically, kernel scheduler 135 rebalances the queues. That is, if the run queue of a particular physical CPU is long, kernel scheduler 135 moves some of the tasks therein to run queues of physical CPUs that are less busy. The process by which kernel scheduler 135 maintains and rebalances run queues for individual physical CPUs is described more fully below.

FIG. 1 also depicts hardware platform 140, which is another component of computer host 100. Hardware platform 140 includes all physical devices, channels, and adapters of computer host 100. Hardware platform 140 includes network adapters (not shown), for network communication, as well as host bus adapters (HBAs) (not shown) which enable communication to external storage devices. In addition, hardware platform 140 includes the physical CPUs (referred to herein as PCPUs) of computer host 100. As shown in FIG. 1, computer host 100 has M PCPUs $145_1$-$145_m$. As shown the figure, kernel scheduler 135 schedules and dispatches tasks for execution on one or more PCPUs 145.

Hardware platform 140 also includes a random access memory (RAM) 141, which, among other things, stores programs currently in execution, as well as data required for such programs. Moreover, the run queues that kernel scheduler 135 maintains for each PCPU are typically maintained in RAM 141.

In order to support the configuration, identification, and scheduling changes needed for executing highly latency sensitive virtual machines, the embodiment depicted in FIG. 1 includes a VM management server 150. VM management server 150 is, in embodiments, a server application executing either within computer host 100, or (as shown in FIG. 1) remotely from computer host 100. Embodiments of VM management server 150 provide an interface (such as a graphical user interface (or GUI)) through which a system administrator may define, configure, and deploy virtual machines for execution on one or more host computers.

In addition, VM management server 150 provides for the configuration of virtual machines as highly latency sensitive virtual machines. According to one or more embodiments, VM management server 150 maintains a latency sensitivity table 155, which defines latency sensitivity characteristics of virtual machines. Latency sensitivity table 155 is described in further detail below.

As shown in FIG. 1, VM management server 150 communicates with computer host 100, either through a direct local connection or over a computer network. In order to facilitate such communication, VM management agent 134 executes on computer host 100. Although VM management agent 134 is not part of kernel 136, embodiments of the agent run at the hypervisor level within hypervisor 130. However, in other embodiments, VM management agent 134 may run as a user program within execution space 120. It should be noted that the processes of VM management agent 134 are also scheduled for execution by kernel scheduler 135.

VM management agent 134 receives instructions from VM management server 150 and carries out tasks on behalf of VM management server 150. Among the tasks performed by VM management agent 134 are configuration and instantiation of virtual machines. One aspect of the configuration of a virtual machine is whether that virtual machine is highly latency sensitive. Thus, VM management agent 134 receives a copy of latency sensitivity table 155 and saves the underlying data within RAM 141 as latency sensitivity data 143. As shown in FIG. 1, once latency sensitivity data 141 is saved to RAM, kernel scheduler 135 then accesses that information in order to determine which virtual machines are highly latency sensitive. Upon determining that one or more virtual machines are highly latency sensitive, kernel scheduler 135 makes certain scheduling changes in order to accommodate the needs of these virtual machines.

FIG. 2 is a block diagram that depicts one embodiment of latency sensitivity table 155. As shown in the figure, latency sensitivity table 155 stores multiple rows of data, where each row corresponds to a particular virtual machine within host 100. Each virtual machine is identified on the host by a unique VM ID 210. A VM ID 210 may be any unique binary or alphanumeric value that is associated with a virtual machine. As shown in FIG. 2, latency sensitivity table 155 has N entries (for VM IDs $210_1$-$210_N$), which correspond to the N virtual machines VM $110_1$-$110_N$ depicted in FIG. 1.

For each VM ID 210, latency sensitivity table 155 stores two values. A first value is a latency sensitivity indicator. This indicator may take on two distinct values (such as Y or N), which indicates whether the corresponding virtual machine is highly latency sensitive. In other embodiments, the latency sensitive indicator may take on more than two values (e.g., High, Medium, Low, or Normal), to provide for specifying different degrees of latency sensitivity for the corresponding virtual machine. In FIG. 2, VM ID $210_1$ (corresponding to VM $110_1$) identifies a highly latency sensitive virtual machine because its latency sensitivity indicator is set to Y. On the other hand, VM ID $210_2$ and VM ID $210_N$ (which correspond to VMs $110_2$ and $110_N$, respectively) identify virtual machines that are not highly latency sensitive virtual machines because their corresponding latency sensitivity indicators are set to N. For example, VM $110_1$ might be a virtual machine that runs a real-time financial trading application, while VMs $110_2$ and $110_N$ might be virtual machines that run batch processing applications (such as billing systems), which typically do not require split-second response time and are generally unaffected by the jitter that might occur in a virtualized computing environment.

The second value that latency sensitivity table 155 stores is an "entitlement" value. The CPU resource entitlement for a virtual machine may be adjusted by specifying a CPU reservation value, a CPU limit value, and a CPU shares value. A CPU reservation value represents a guaranteed minimum allocation of CPU resources for the virtual machine. By contrast, a CPU limit value represents a maximum allocation of CPU resources for the virtual machine. Finally, a CPU shares value represents an amount of CPU resources that a virtual machine is allocated relative to an amount of CPU resources allocated to other virtual machines. Thus, with a CPU shares allocation, the CPU entitlement for a virtual machine may change dynamically as other virtual machines are powered on, powered off, or have their own CPU shares values configured.

In the embodiment shown in FIG. 2, the entitlement value is a percentage. In this embodiment, the entitlement value represents a reserved percentage of CPU resources for the virtual CPUs of a given VM (i.e., a CPU reservation value). That is, the reservation represented by an entitlement value specifies a guaranteed minimum allocation for the corresponding virtual machine. According to embodiments, a virtual machine may be powered on only if there are enough unreserved CPU resources available to satisfy the reservation of the virtual machine. It should be noted that the entitlement value is not limited to being expressed as a percentage. In other embodiments, the entitlement value may be represented as a number of reserved CPU cycles (such as a certain fraction of a processor's speed in gigahertz (GHz)).

In FIG. 2, VM $110_1$ (as identified by VM ID $210_1$) has an entitlement value of 100 percent (%), which means that 100% of a physical CPU is reserved to the VCPU (i.e., VCPU $125_1$) associated with VM $110_1$. It should be noted that, in this example, it is assumed that VM $110_1$ only has a single VCP 125. If, however, VM $110_1$ has more than one VCPU, then each of those VCPUs would share 100% of the reserved capacity of a single physical CPU.

Referring to FIG. 2, VM $110_2$ (as identified by VM ID $210_2$) has a corresponding entitlement value of 100%. Thus, although VM $110_2$ is not highly latency sensitive (as shown by its latency sensitivity indicator being set to N), the host will reserve 100% of the capacity of a physical CPU for VM $110_2$. Further, VM $110_N$ (as identified by VM ID $210_N$) has an entitlement value of 50%, which means that 50% of the capacity of a physical CPU is reserved for executing the virtual CPUs (i.e., VCPUs $125_N$) of that virtual machine.

According to one or more embodiments, if a virtual machine is both highly latency sensitive and has a maximum entitlement value, then that virtual machine is granted exclusive affinity to one or more physical CPUs. For example, assuming that VM $110_1$ has one virtual CPU VCPU $125_1$, then VM $110_1$ (or, equivalently, VCPU $125_1$) is given exclusive affinity to one physical CPU in computer host 100 (i.e., one of PCPUs $145_1$-$145_m$). On the other hand, if VM $110_1$ has two virtual CPUs, then, in order for both virtual CPUs to be given exclusive affinity to a physical CPU, then the entitlement value in latency sensitivity table 155 for VM ID $210_1$ is set to 200% (i.e., 100% reservation for each virtual CPU in the set of VCPUs $125_1$ corresponding to VM $110_1$).

When a virtual CPU of a virtual machine has exclusive affinity to a physical CPU, the physical CPU is, effectively, dedicated to running that particular virtual CPU. That is, the kernel scheduler (i.e., kernel scheduler 135) will refrain from scheduling any processes for execution on the physical CPU to which the virtual CPU has exclusive affinity, even in cases where the physical CPU is in an idle state. Further, kernel scheduler 135 will refrain from scheduling most interrupt processing on the physical CPU. Instead, interrupt processing is scheduled and dispatched on other physical CPUs, provided no virtual CPUs have exclusive affinity to such other physical CPUs.

In addition, when an executing virtual machine has its latency sensitivity indicator dynamically set to Y and its entitlement dynamically set to a maximum percentage value, kernel scheduler 135 detects (or is informed of) these configuration changes. Further, kernel scheduler 135 detects (or is informed) when a virtual machine having its latency sensitivity indicator previously set to Y and its entitlement previously set to a maximum percentage is powered on. In either case, kernel scheduler 135 takes steps to allocate the required number of physical CPUs to the virtual machine's virtual CPUs. Thus, if all physical CPUs are executing tasks at the time the virtual machine is powered on (or, alternatively, at the time the latency sensitivity indicator and entitlement of the virtual machine are changed), kernel scheduler 135 migrates an executing task from one physical CPU to another physical CPU. Kernel scheduler performs this migration for as many physical CPUs as the number of virtual CPUs of the virtual machine. Thus, when the virtual machine's virtual CPUs have tasks that need to be executed, the tasks are executed directly on the allocated physical CPUs without incurring any scheduling or context-switching overhead. In addition, according to embodiments, kernel scheduler 135 ensures that a minimum number of physical CPUs are available for processing the tasks for non-highly latency sensitive virtual machines. In these embodiments, if powering on and allocating a number of physical CPUs to a highly latency sensitive virtual machine would result in the number of physical CPUs available for processing non-highly latency sensitive tasks to fall below this minimum number, then the virtual machine is not powered on.

It should be noted that a virtual machine may have an entitlement value set to a maximum reservation percentage (i.e., 100% for each of the virtual CPUs of that virtual machine), yet not have exclusive affinity to any particular physical CPU. An example of this case is illustrated in FIG. 2 by VM ID $210_2$ in latency sensitivity table 155. VM ID $210_2$ has an entitlement value of 100% (which, assuming that VM $110_2$ has a single virtual CPU, would be a maximum reservation percentage). However, as shown in FIG. 2, VM ID $210_2$ has a latency sensitivity indicator set to N, meaning that VM $110_2$ is not highly latency sensitive. In this case, kernel scheduler 135 ensures that the virtual CPU of VM $110_2$ (i.e., VCPU $125_2$) is given a full (i.e., 100%) allocation of a given physical CPU. However, in this case, VCPU $125_2$ does not have exclusive access to a physical CPU. That is, when a physical CPU allocated to VCPU $125_2$ becomes idle, kernel scheduler 135 schedules other tasks on this physical CPU. When VCPU $125_2$ becomes active, then these other tasks are (eventually) preempted and the tasks of VCPU $125_2$ are scheduled for processing on the physical CPU. However, this differs from the exclusive affinity that VCPU $125_1$ has for a given physical CPU because, in the case of VCPU $125_2$, scheduling overhead is incurred by the scheduling, execution, and preemption of the other tasks on that physical CPU when that physical CPU becomes idle. As previously mentioned, for a virtual machine that has exclusive affinity to a physical CPU (such as highly latency sensitive VM $110_1$), this scheduling overhead is effectively eliminated.

It should also be noted that, although a highly latency sensitive virtual machine is given exclusive affinity to one or more particular physical CPUs, it is possible, though it is a rare occasion, for another process (not related to the virtual machine's virtual CPUs) to be executed on the one or more particular physical CPUs. These exceptional conditions are described in further detail below.

Figure 3A:
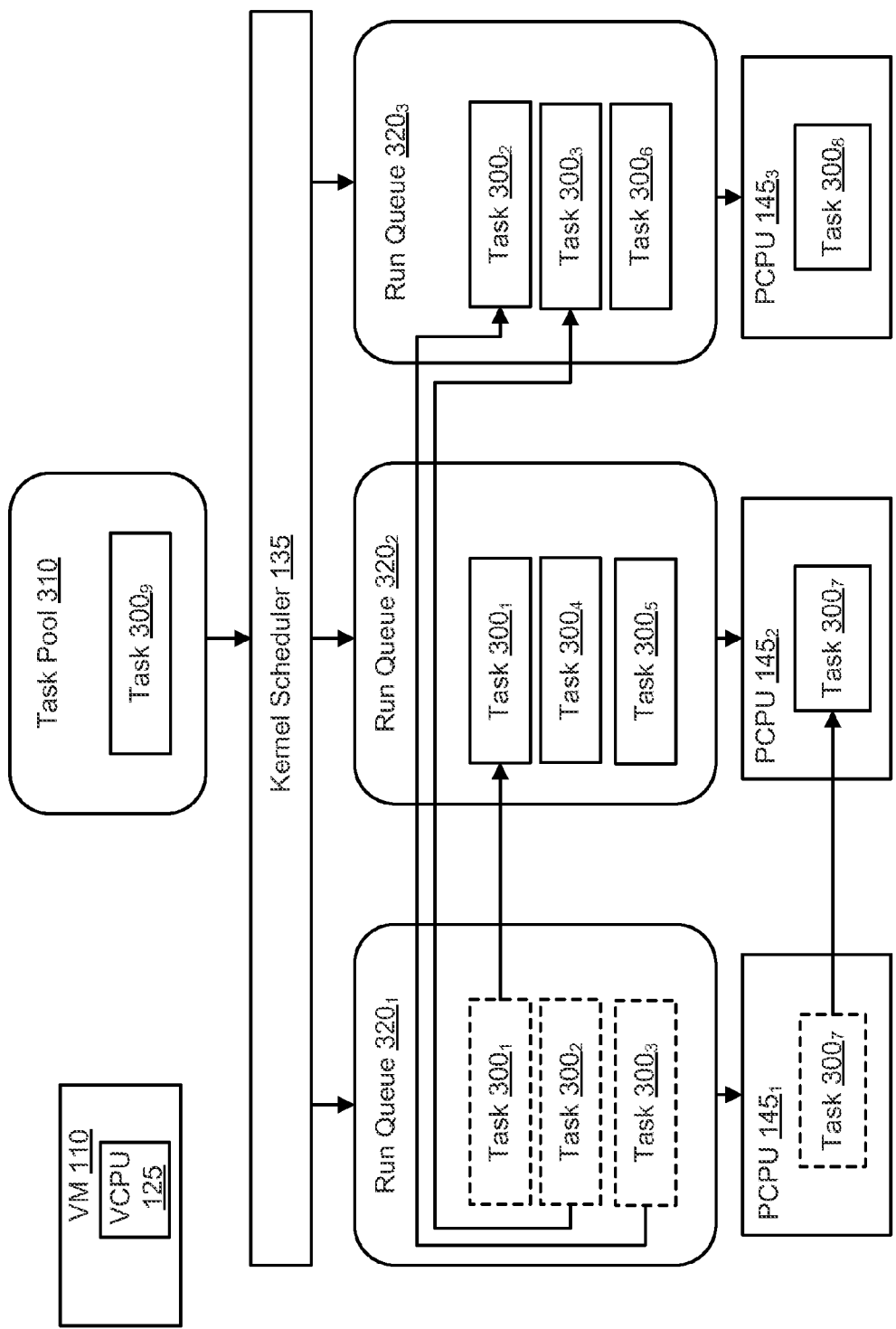
FIGS. 3A and 3B are diagrams that illustrate a kernel scheduler that allocates a physical CPU to a virtual CPU of a highly latency sensitive virtual machine, according to embodiments.
Figure 3B:
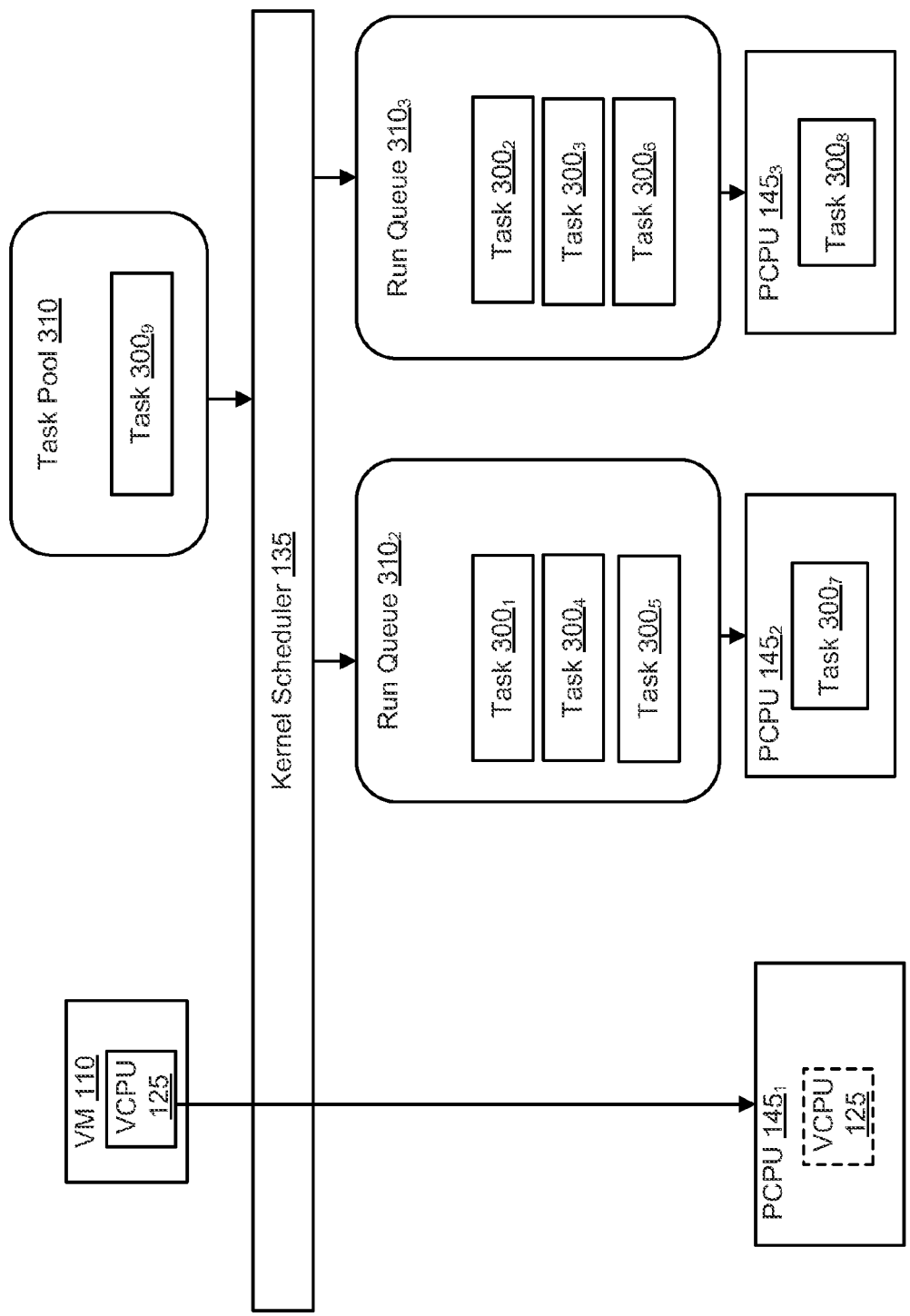

FIGS. 3A and 3B are conceptual diagrams that illustrate the allocation of a physical CPU to a virtual CPU of a highly latency sensitive virtual machine, according to one or more embodiments. In FIG. 3A, VM 110 is a highly latency sensitive virtual machine (as defined previously by an entry in latency sensitivity table 155), and which has a sufficient entitlement value (i.e., a 100% reservation for each of its virtual CPUs). VM 110 in FIG. 3A has a single VCPU 125, which is shown (for illustrative purposes only) as being a part of VM 110.

In FIG. 3A, kernel scheduler 135 schedules tasks by first receiving those tasks from a task pool 310, which contains tasks that require execution time on a physical CPU. In FIG. 3A, only one unscheduled task (task $300_9$) is in task pool 310. Kernel scheduler 135 then places each task in a run queue 320, each of which corresponds to a physical CPU (PCPU) 145. It should be noted that the embodiment of FIG. 3A has three PCPUs $145_1$-$145_3$. Thus, run queue $320_1$ queues tasks for PCPU $145_1$, run queue $320_2$ queues tasks for PCPU $145_2$, and run queue $320_3$ queues tasks for PCPU $145_3$.

In the figure, kernel scheduler 135 detects (or is informed of) the powering on of VM 110 or, alternatively, of a change in latency sensitivity indicators that correspond to VM 110. Kernel scheduler 135 then determines that VM 110 is highly latency sensitive (via inspection of a corresponding entry in latency sensitivity table 155) and is to be allocated one physical CPU to which VM 110 (or, more precisely, VCPU 125) is to have exclusive affinity. In the embodiment depicted, kernel scheduler 135 selects PCPU $145_1$ to allocate for VCPU 125. However, as shown, PCPU $145_1$ has executing thereon task $300_7$. Further, run queue $320_1$ (which is the run queue for PCPU $145_1$) has three tasks queued therein (i.e., tasks $300_1$, $300_2$, and $300_3$). Thus, before VCPU 125 is granted exclusive affinity to PCPU $145_1$, kernel scheduler 135 migrates these tasks to other physical CPUs. For example, as shown in FIG. 3A, task $300_7$ (which currently executes on PCPU $145_1$) is migrated directly to execute on PCPU $145_2$. It should be noted that task $300_7$ may also be migrated to execute directly on PCPU $145_3$ or, alternatively, may be queued to either processor in run queue $320_2$ or run queue $320_3$.

Kernel scheduler 135 also migrates tasks waiting for execution in run queue $320_1$. Thus, as shown in FIG. 3A, task $300_1$ is migrated to run queue $320_2$ and tasks $300_2$ and $300_3$ are migrated from run queue $320_1$ to run queue $320_3$. In this way, when the task migrations are complete, PCPU $145_1$ may be dedicated to executing tasks for VCPU 125.

As shown in FIG. 3B, when VCPU 125 begins executing tasks for VM 110, these tasks are executed directly on PCPU $145_1$. That is, kernel scheduler 135 refrains, generally, from executing any tasks on PCPU $145_1$ that do not pertain to VCPU 125. This is illustrated by the absence of a run queue corresponding to PCPU $145_1$. However, kernel scheduler 135 continues to receive tasks from task pool 310 and schedules these tasks in run queues $310_2$ and $310_3$. Further, kernel scheduler 135 performs load balancing between PCPUs $145_2$ and $145_3$. That is, if either of these PCPUs becomes idle, then kernel scheduler 135 removes tasks from the run queue of the other PCPU and moves them to the run queue of the idle PCPU. However, should PCPU $145_1$ (to which VCPU 125 has exclusive affinity) becomes idle, kernel scheduler 135 does not migrate any tasks to be scheduled to that PCPU.

Figure 4:
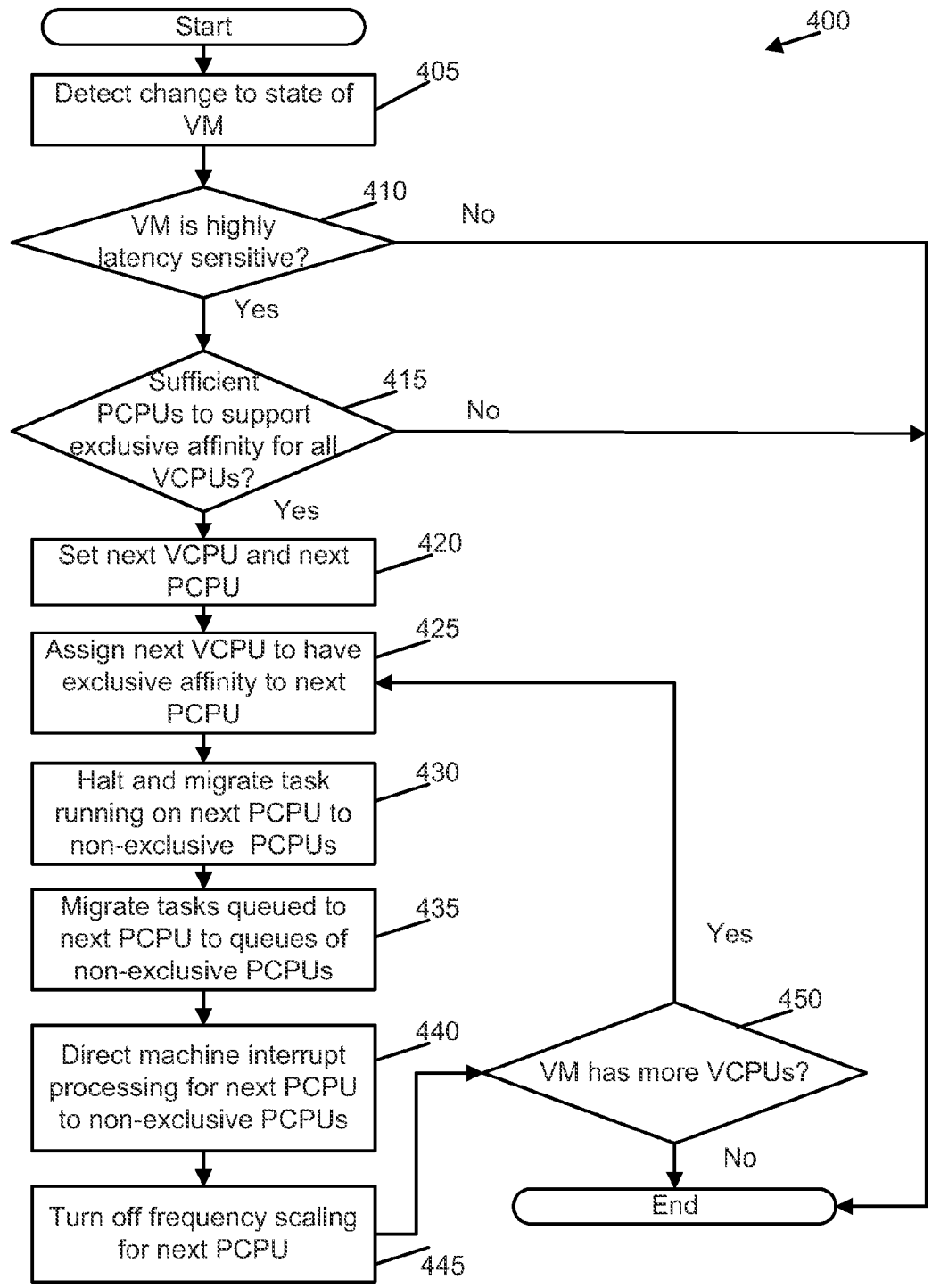
FIG. 4 is a flow diagram that depicts a method for granting exclusive affinity for one or more physical CPUs to virtual CPUs of a highly latency sensitive virtual machine, according to embodiments.

FIG. 4 is a flow diagram that depicts a method 400 for allocating of one or more physical CPUs to virtual CPUs of a highly latency sensitive virtual machine, according to embodiments. In embodiments, method 400 is executed by a kernel scheduler, such as kernel scheduler 135 described herein.

Method 400 begins at step 405, where the kernel scheduler detects (or is informed of) a change to a state of a virtual machine. In one or embodiments, the state change that the kernel scheduler detects is the powering on of the virtual machine, where the virtual machine was previously in a powered-off state. In other embodiments, the state change that the kernel scheduler detects is a change in configuration settings of the virtual machine, where the configuration settings relate to the latency sensitivity of the virtual machine. Next, at step 410, the kernel scheduler determines whether the virtual machine is highly latency sensitive. As described earlier, one or embodiments of kernel scheduler 135 inspects a table (or similar data structure) in RAM that stores latency sensitivity information in order to determine that the virtual machine: (a) has a latency sensitivity indicator set to Y (or some value that indicates latency sensitivity for the virtual machine); and (b) has sufficient CPU entitlement set for its virtual CPUs (as represented in FIG. 2 by the entitlement value in latency sensitivity table 155). In embodiments described herein, a sufficient CPU entitlement may be expressed as the number of virtual CPUs multiplied by 100%. That is, if the virtual machine has one virtual CPU, then a sufficient CPU entitlement is 100%. If the virtual machine has two virtual CPUs, then a sufficient CPU entitlement is 200%, and so on. It should be noted that in the embodiment depicted in FIG. 2, the entitlement values represent CPU reservations (i.e., guaranteed minimum CPU allocation amounts), as was described earlier.

If, at step 405, kernel scheduler 135 determines that the virtual machine is not highly latency sensitive, then method 400 terminates. That is, processes for the virtual CPUs of the virtual machine are scheduled according to the scheduling policy implemented by the kernel scheduler for a non-highly latency sensitive virtual machine. However, if the kernel scheduler determines that the virtual machine is highly latency sensitive, then method 400 proceeds to step 415.

At step 415, kernel scheduler 135 determines whether the computer host has a sufficient number of physical CPUs in order to support exclusive affinity for all virtual CPUs of the virtual machine. For example, if computer host 100 has six physical CPUs and the virtual machine has five virtual CPUs, then kernel scheduler 135 determines that there are insufficient physical CPUs in order to support exclusive affinity for the virtual machine. This assumes a policy of maintaining at least two physical CPUs for non-highly latency sensitive tasks. However, if the virtual machine has four or fewer virtual CPUs, then kernel scheduler 135 determines that there are sufficient physical CPU resources to support exclusive affinity for all virtual CPUs of the virtual machine. Further, the pool of available physical CPUs is decreased by any number of physical CPUs previously allocated to other highly latency sensitive virtual machines.

If, at step 415, kernel scheduler 135 determines that there are insufficient physical CPU resources to support exclusive affinity for the virtual machine, then method 400 terminates. If, however, kernel scheduler 415 determines that there are enough physical CPUs to allocate to the virtual machine, then method 400 proceeds to step 420.

At step 420, kernel scheduler 135 sets both a next virtual CPU (i.e, one of the virtual CPUs of the virtual machines) and a next physical CPU (corresponding to one of the physical CPUs on computer host 100). It should be noted that kernel scheduler 135 makes the selection of physical CPU based on a variety of factors, such as CPU speed, whether the processor is idle, the number of tasks currently queued to the physical CPU, and the non-uniform memory access (NUMA) home node assignment for the virtual machine. Next, at step 425, kernel scheduler 135 assigns the next virtual CPU to have exclusive affinity to the next physical CPU. Kernel scheduler 135 may make this assignment by updating a data structure in memory (not shown) that associates virtual and physical CPUs.

At step 430, kernel scheduler 135 halts any task executing on the next physical CPU and migrates this task to another physical CPU. The target physical CPU is a "non-exclusive" physical CPU; that is, no virtual CPU of any other virtual machine has exclusive affinity to the target physical CPU. The migration may take place by kernel scheduler queuing the migrated task to the target physical CPU by placing the task in the run queue thereof. In some embodiments, kernel scheduler determines the priority or state of the previously executing task and, depending on the priority, may preempt any running tasks on the target physical CPU and immediately begin executing the migrated task thereon.

Next, at step 435, kernel scheduler 135 migrates tasks queued to the next physical CPU to one or more other physical CPUs. These other target physical CPUs are not dedicated to executing tasks of any one particular virtual CPU. In other words, no virtual CPU of any other virtual machine has exclusive affinity to any of the target physical CPUs. In embodiments, kernel scheduler 135 queues the migrated tasks by removing them from the run queue of the next physical CPU and placing the migrated tasks in one or more run queues, each of which corresponds to one of the target physical CPUs. It should be noted that some tasks that cannot be migrated from the next physical CPU, even though the virtual machine is being granted exclusive affinity thereto. These exceptional tasks are described more fully below. Method 400 then proceeds to step 435.

At step 440, kernel scheduler 135 migrates nearly all machine interrupt processing from the next physical CPU to a target "non-exclusive" physical CPU. Thus, once the next physical CPU is assigned to a virtual CPU of a highly latency sensitive virtual machine, hardware interrupts (which are typically intercepted by an interrupt handler for a corresponding device) are processed on physical CPUs other than the next physical CPU. For example, an interrupt may occur on a physical network adapter. Hypervisor 130 may then, in response, call a corresponding interrupt handler for the network adapter. The interrupt handler, like all tasks, requires CPU execution cycles. However, kernel scheduler 135 directs such processing away from the next physical CPU (i.e., the physical CPU assigned to the highly latency sensitive virtual machine), but, rather, toward one or more "non-exclusive" physical CPUs (i.e., ones to which no virtual CPU has exclusive affinity). Although the majority of hardware interrupt processing is not scheduled to the next physical CPU, there are some hardware interrupts that are not migrated. Such interrupts include local advanced interrupt program controller (APIC) interrupts, inter-processor interrupts (IPIs), and certain bottom-half (BH) handlers, all of which are localized on the next physical CPU and must be processed thereby.

Once kernel scheduler 135 directs interrupt processing away from the next physical CPU, method 400 proceeds to step 445. At step 445, kernel scheduler 135 turns off frequency scaling for the next physical CPU. In one or more embodiments, frequency scaling provides for the dynamic switching of the frequency of a physical CPU, depending upon on the load requirement of the CPU. Thus, if a processor is a low load requirement, its frequency is adjusted downward in order to operate the CPU in a way such that it consumes less power. For example, a processor may have its operating frequency adjusted from 2 GHz to 600 megahertz (MHz). However, the adjustment of the operating frequency of a physical CPU requires constant monitoring of system load, which consume processing cycles that contribute to execution latency. Thus, for physical CPUs that are assigned for virtual machines with exclusive affinity, frequency scaling is disabled. The disabling may be accomplished, according to embodiments, by running in the processor in a certain performance state ("P-state"), such as P0. This state is maintained for as long as a highly latency sensitive virtual machine has exclusive affinity to the physical CPU for which frequency scaling is disabled.

At step 450, kernel scheduler 135 determines whether the virtual machine has additional virtual CPUs that require exclusive affinity to one or more other processors. If the virtual machine does not have any more virtual CPUs, then method 400 terminates. However, if the virtual machine does have additional virtual CPUs, then method 400 proceeds back to step 420, where kernel scheduler 135 sets a next virtual CPU and a next physical CPU. Method 400 then repeats steps 425-450 for as many additional virtual CPUs that the virtual machine has. The method terminates once all virtual CPUs of the virtual machine are given exclusive affinity to a physical CPU.

Figure 5:
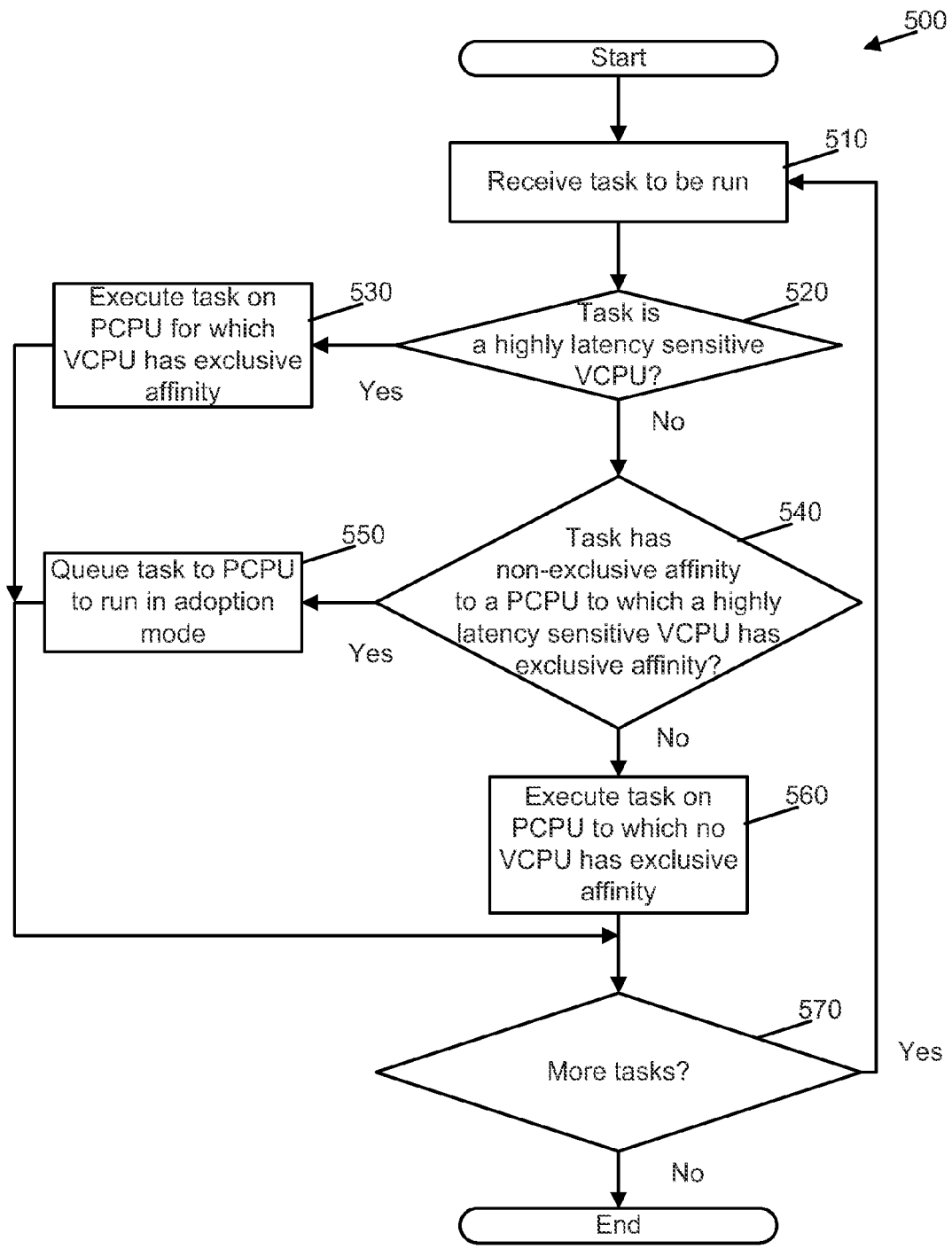
FIG. 5 is a flow diagram that illustrates a method by which a kernel scheduler schedules for execution tasks in a computer host that executes one or more highly latency sensitive virtual machines, according to embodiments.

FIG. 5 is a flow diagram that illustrates a method 500 for scheduling tasks in a computer host that supports the execution of one or more highly latency sensitive virtual machines, according to one or more embodiments. Method 500 is executed by a kernel scheduler that executes in the computer host, such as kernel scheduler 135 described above.

Method 500 begins at step 510, where kernel scheduler 135 receives a task to be executed on the computer host. As depicted in FIGS. 3A and 3B, a task that requires processing cycles may be received from a task pool, such as task pool 310. Next, at step 520, kernel scheduler determines whether the task to be executed is associated with a highly latency sensitive virtual CPU. In one or more embodiments, kernel scheduler 135 makes this determination by determining that the task is an executing virtual CPU of a virtual machine and further determining whether the virtual machine has been granted exclusive affinity to a particular physical CPU. If kernel scheduler 135 determines that the virtual machine is highly latency sensitive, and thus its virtual CPU has exclusive affinity to a particular virtual CPU, kernel scheduler 135, at step 530, immediately executes the task on the physical CPU to which the virtual CPU has exclusive affinity. It should be noted that, in cases where the physical CPU already has a task executing on it that corresponds to the same virtual CPU being scheduled, then kernel scheduler 135 queues the received task to that physical CPU. Further, if the physical CPU has another task executing on it (for example, a virtual machine running in "adoption mode," as described below), kernel scheduler 135 will preempt that task in order to run the current received task. Once the task is executed (or queued for execution) to the physical CPU, method 500 proceeds to step 570, where kernel scheduler 135 determines whether there are more tasks to be scheduled.

If, at step 520, kernel scheduler 135 determines that the received task does not correspond to a highly latency sensitive virtual CPU, then method 500 proceeds to step 540. At step 540, kernel scheduler 135 determines whether the received task corresponds to a virtual machine that has non-exclusive affinity to a physical CPU to which a virtual CPU of a highly latency sensitive virtual machine already has exclusive affinity. In some embodiments, it is possible to set a virtual machine to have affinity for one or more CPUs in a multi-processor host computer. In such embodiments, such virtual machines are restricted to being executed on the processors to which they are specified as having affinity to. However, this affinity setting differs from exclusive affinity. As previously mentioned, exclusive affinity causes tasks and interrupt processing for other (non-highly latency sensitive) virtual machines and user programs to be migrated away from a dedicated physical CPU. Further, when the physical CPU becomes idle, the scheduler refrains from scheduling other tasks to that CPU. By contrast, when a virtual machine has non-exclusive affinity to a physical CPU, the kernel scheduler will scheduler tasks to that physical CPU when it becomes idle. Further, a virtual machine that is granted non-exclusive affinity to a particular virtual CPU must execute only on that physical CPU. Thus, when a virtual machine is granted non-exclusive affinity to a physical CPU to which a highly latency sensitive virtual machine has been granted exclusive affinity, a conflict between the virtual machines arises.

To resolve this conflict, kernel scheduler 135 schedules the task of the virtual machine with non-exclusive affinity for execution on the physical CPU in "adoption" mode. When a task executes in adoption mode, it is allowed to share the physical CPU to which the highly latency sensitive virtual machine has exclusive affinity. However, in order to maximize the performance of the highly latency sensitive virtual machine, kernel scheduler 135 runs the highly latency sensitive virtual machine at a higher priority than the non-latency sensitive virtual machine. Further, kernel scheduler 135 may operate to minimize the number of context switches between the two virtual machines on the physical CPU by detecting when the highly latency sensitive virtual has gone into a prolonged idle state. Only at those times is the non-highly latency sensitive virtual machine dispatched and executed on the physical CPU.

Referring back to FIG. 5, if kernel scheduler determines, at step 540, that the received task has non-exclusive affinity to a physical CPU to which a highly latency sensitive virtual machine has exclusive affinity, then method 500 proceeds to step 550, where the task is queued to that physical CPU to run in adoption mode. Alternatively, in some embodiments, kernel scheduler 135 may detect that the highly latency sensitive virtual CPU (which has exclusive affinity to the physical CPU) is in a long-term idle state. In such a case, the received task may be immediately executed on the physical CPU. After step 550, method 500 proceeds to step 570, where kernel scheduler 135 determines whether there are more tasks to be scheduled.

However, if kernel scheduler 135 determines, at step 540, that the received task does not have non-exclusive affinity to a physical CPU to which a virtual CPU of a highly latency sensitive virtual machine has exclusive affinity, then method 500 proceeds to step 560. At step 560, kernel scheduler 135 executes (or queues) the received task on a physical CPU to which no virtual CPU has exclusive affinity. After step 560, method 500 proceeds to step S700, where kernel scheduler 135 whether there are more tasks to be scheduled.

If, at step 570, kernel scheduler 135 determines that there are more tasks to be scheduled, then method 500 proceeds back to step 510, where a next task is received. If no tasks remain to be scheduled, then method 500 terminates.

Certain embodiments as described above involve a hardware abstraction layer on top of a host computer. The hardware abstraction layer allows multiple containers to share the hardware resource. These containers, isolated from each other, have at least a user application running therein. The hardware abstraction layer thus provides benefits of resource isolation and allocation among the containers. In the foregoing embodiments, virtual machines are used as an example for the containers and hypervisors as an example for the hardware abstraction layer. As described above, each virtual machine includes a guest operating system in which at least one application runs. It should be noted that these embodiments may also apply to other examples of containers, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers, each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—-CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure (s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. In a host computer having one or more physical central processing units (CPUs) that support the execution of a plurality of containers, the containers each including one or more processes, wherein the host computer is programmed to perform a method of assigning at least one of the processes to have exclusive affinity to a corresponding physical CPU, the method comprising:

determining that a first container is latency sensitive; and responsive to the determining, assigning each of the processes of the first container to have exclusive affinity to one or more corresponding physical CPUs, said assigning comprising:

migrating running tasks on the corresponding physical CPUs to the one or more other physical CPUs of the host system;

directing queued tasks and interrupt processing for the corresponding physical CPUs to the one or more other physical CPUs; and executing tasks of each of the processes of the first container on the one or more corresponding CPUs to which the process has exclusive affinity.

2. A system, comprising:
a host computer having a memory and one or more physical central processing units (CPUs) that support the execution of a plurality of containers, the containers each including one or more processes, wherein the host computer is programmed to perform a method of assigning at least one of the processes to have exclusive affinity to a corresponding physical CPU, the method comprising:
determining that a first container is latency sensitive; and
responsive to the determining, assigning each of the processes of the first container to have exclusive affinity to one or more corresponding physical CPUs, said assigning comprising:
migrating running tasks on the corresponding physical CPUs to the one or more other physical CPUs of the host system;
directing queued tasks and interrupt processing for the corresponding physical CPUs to the one or more other physical CPUs; and
executing tasks of each of the processes of the first container on the one or more corresponding CPUs to which the process has exclusive affinity.

3. The system of claim 2, wherein the first container is a first virtual machine and each of the one or more processes included in the first container is a virtual CPU, and at least one virtual CPU is assigned to have exclusive affinity to a corresponding physical CPU.

4. The system of claim 3, the method further comprising:
detecting a change to a state of the first virtual machine, wherein detecting the change to the state of the first virtual machine comprises detecting that the state of the first virtual machine has been changed from powered-off to powered-on.

5. The system of claim 4, wherein detecting the change to the state of the first virtual machine comprises detecting that a latency sensitivity indicator for the first virtual machine has been changed.

6. The system of claim 3, the method further comprising, prior to the assigning of the virtual CPUs, determining that the host computer has a sufficient number of physical CPUs to which the virtual CPUs are to be assigned.

7. The system of claim 6, wherein the method further comprises reserving a predetermined number of physical CPUs of the host computer to process tasks that do not correspond to the first virtual machine.

8. The system of claim 3, wherein determining that the first virtual machine is latency sensitive comprises:
reading a latency sensitivity indicator for the first virtual machine;
reading a CPU entitlement value for the first virtual machine;
determining that the latency sensitivity indicator is a predetermined value; and
determining that the CPU entitlement value is a maximum value.

9. The system of claim 8, wherein the maximum value for the CPU entitlement value indicates that each virtual CPU of the first virtual machine is permitted to consume the full processing capacity of one of the physical CPUs.

10. The system of claim 3, wherein migrating the processes from the corresponding physical CPUs comprises:
halting a task that is currently being executed by one of the corresponding physical CPUs; and
placing the halted task into a run queue of one of the one or more other physical CPUs.

11. The system of claim 10, wherein migrating the processes from the corresponding physical CPUs further comprises:
copying a task from a run queue of one of the corresponding physical CPUs to a run queue of one of the one or more other physical CPUs; and
removing the task from the run queue of the corresponding physical CPU.

12. The system of claim 3, wherein the method further comprises disabling frequency scaling for each of the corresponding physical CPUs.

13. A non-transitory computer-readable medium comprising instructions executable by a host computer, the host computer having one or more physical central processing units (CPUs) that support the execution of a plurality of containers, the containers each including one or more processes, where the instructions, when executed, cause the host computer to perform a method of assigning processes to execute exclusively on a corresponding physical CPU, the method comprising:
determining that a first container is latency sensitive; and
responsive to the determining, assigning each of the processes of the first container to have exclusive affinity to one or more corresponding physical CPUs, said assigning comprising:
migrating running tasks from the corresponding physical CPUs to the one or more other physical CPUs of the host system;
directing queued tasks and interrupt processing for the corresponding physical CPUs to the one or more other physical CPUs; and
executing tasks of each of the processes of the first container on the one or more corresponding CPUs to which the process has exclusive affinity.

14. The computer-readable medium of claim 13, wherein the first container is a first virtual machine and each of the one or more processes included in the first container is a virtual CPU, and at least one virtual CPU is assigned to have exclusive affinity to a corresponding physical CPU.

15. The computer-readable medium of claim 14, the method further comprising:
detecting a change to a state of the first virtual machine, wherein detecting the change to the state of the first virtual machine comprises detecting that the state of the first virtual machine has been changed from powered-off to powered-on.

16. The computer-readable medium of claim 15, wherein detecting the change to the state of the first virtual machine further comprises detecting that a latency sensitivity indicator for the first virtual machine has been changed.

17. The computer-readable medium of claim 14, wherein the method further comprises, prior to the assigning of the virtual CPUs, determining that the host computer has a sufficient number of physical CPUs to which the virtual CPUs are to be assigned.

18. The computer-readable medium of claim 17, wherein the method further comprises reserving a predetermined number of physical CPUs of the host computer to process tasks that do not correspond to a latency sensitive virtual machine.

19. The computer-readable medium of claim 14, wherein determining that the first virtual machine is latency sensitive comprises:
reading a latency sensitivity indicator for the first virtual machine;

reading a CPU entitlement value for the first virtual machine
determining that the latency sensitivity indicator is a predetermined value; and
determining that the CPU entitlement value is a maximum value.

20. The computer-readable medium of claim 19, wherein the maximum value for the CPU entitlement value indicates that each virtual CPU of the first virtual machine is permitted to consume the full processing capacity of one of the physical CPUs.

* * * * *